US009853718B2

United States Patent
Chuberre et al.

(10) Patent No.: US 9,853,718 B2
(45) Date of Patent: Dec. 26, 2017

(54) DYNAMICALLY ADJUSTING THE TRANSMISSION MODE IN A SATELLITE COMMUNICATION SYSTEM

(71) Applicant: THALES, Courbevoie (FR)

(72) Inventors: Nicolas Chuberre, Pibrac (FR); Fabrice Arnal, Cugnaux (FR); Cyrille Blosse, Toulouse (FR); Cédric Baudouin, Toulouse (FR); Benoît Garnier, Toulouse (FR)

(73) Assignee: Thales, Courbevoie (FR)

( * ) Notice: Subject to any disclaimer, the term of this patent is extended or adjusted under 35 U.S.C. 154(b) by 36 days.

(21) Appl. No.: 15/017,238

(22) Filed: Feb. 5, 2016

(65) Prior Publication Data
US 2016/0233950 A1    Aug. 11, 2016

(30) Foreign Application Priority Data
Feb. 6, 2015  (FR) ................................. 15 00230

(51) Int. Cl.
*H04W 4/00* (2009.01)
*H04B 7/185* (2006.01)
(Continued)

(52) U.S. Cl.
CPC ....... *H04B 7/18578* (2013.01); *H04B 7/1856* (2013.01); *H04B 7/18513* (2013.01);
(Continued)

(58) Field of Classification Search
None
See application file for complete search history.

(56) References Cited

U.S. PATENT DOCUMENTS 7,657,644 B1 * 2/2010 Zheng ................. H04L 12/1886
                                                       709/231
8,432,808 B1    4/2013 Dankberg et al.
(Continued)

FOREIGN PATENT DOCUMENTS

EP    1 059 763 A2    12/2000
EP    2 480 004 A2    7/2012
(Continued)

OTHER PUBLICATIONS

Chen et al., "Wormhole caching with http push method for a satellite-based web content multicast and replication scheme," Mar. 1999, pp. 1-12, XP002201410 <http://citeseer.nj.nec.com/chen99wormhol.html>.

(Continued)

*Primary Examiner* — Idowu O Osifade
(74) *Attorney, Agent, or Firm* — Baker Hostetler LLP (57) ABSTRACT

A system and method for transmitting a data stream between a server and a user terminal, comprises at least one satellite gateway associated with a satellite router communicating with at least one satellite terminal associated with a terminal router, wherein the terminal router is configured, when it receives a stream request from a user terminal, to search for it in its memory resources and, if appropriate, transmit it to the user terminal, the satellite router is configured to transmit the request to the server, estimate a popularity of the stream and transmit a message of correspondence between the stream and broadcasting parameters then convert the stream into a point-to-multipoint stream adapted to the broadcasting parameters, the terminal router is configured to convert point-to-multipoint streams into point-to-point streams and transmit them to the user terminals.

16 Claims, 3 Drawing Sheets

(51) Int. Cl.
- *H04L 29/08* (2006.01)
- *H04W 4/06* (2009.01)
- *H04W 72/08* (2009.01)
- *H04L 12/18* (2006.01)
- *H04L 12/761* (2013.01)
- *H04W 40/02* (2009.01)
- *H04L 12/725* (2013.01)

(52) U.S. Cl.
CPC ..... *H04B 7/18517* (2013.01); *H04B 7/18523* (2013.01); *H04B 7/18526* (2013.01); *H04B 7/18528* (2013.01); *H04B 7/18536* (2013.01); *H04B 7/18558* (2013.01); *H04B 7/18567* (2013.01); *H04B 7/18584* (2013.01); *H04B 7/18589* (2013.01); *H04B 7/18595* (2013.01); *H04L 67/06* (2013.01); *H04L 67/289* (2013.01); *H04L 67/2823* (2013.01); *H04L 67/2847* (2013.01); *H04L 67/2852* (2013.01); *H04L 67/2876* (2013.01); *H04L 67/322* (2013.01); *H04L 67/325* (2013.01); *H04L 67/327* (2013.01); *H04W 4/06* (2013.01); *H04W 72/085* (2013.01); *H04L 12/189* (2013.01); *H04L 45/16* (2013.01); *H04L 45/306* (2013.01); *H04L 67/303* (2013.01); *H04W 40/02* (2013.01); *Y02B 60/50* (2013.01)

(56) References Cited

U.S. PATENT DOCUMENTS

| | | |
|---|---|---|
| 2002/0001310 A1* | 1/2002 | Mai ............... H04L 12/1836 370/390 |
| 2002/0136201 A1 | 9/2002 | Buchsbaum et al. |
| 2004/0109449 A1* | 6/2004 | Seo ............... H04B 7/18584 370/390 |
| 2005/0259682 A1 | 11/2005 | Yosef et al. |
| 2010/0177642 A1 | 7/2010 | Sebastian et al. |
| 2012/0324036 A1 | 12/2012 | Chatterjee et al. |
| 2014/0282777 A1* | 9/2014 | Gonder ............. H04L 65/605 725/109 |

FOREIGN PATENT DOCUMENTS

| | | |
|---|---|---|
| WO | 00/42519 A1 | 7/2000 |
| WO | 2004/017561 A | 2/2004 |

OTHER PUBLICATIONS

"Satellite Earth Stations and Systems (SES); Broadband Satellite Multimedia; IP interworking over satellite; Multicasting; ETSI TR 102 156," IEEE, LIS, vol. SES-BSM, No. V.1.1, Apr. 1, 2003, XP014015561.

* cited by examiner

DYNAMICALLY ADJUSTING THE TRANSMISSION MODE IN A SATELLITE COMMUNICATION SYSTEM

CROSS-REFERENCE TO RELATED APPLICATION

This application claims priority to foreign French patent application No. FR 1500230, filed on Feb. 6, 2015, the disclosure of which is incorporated by reference in its entirety.

FIELD OF THE INVENTION

The invention lies in the field of high bit rate satellite communication systems, and more particularly the optimization of the use of the bandwidth in these systems.

Internet traffic, pulled primarily by the consumption of multimedia content of increasing volumes, and by the increase in the number of services, is increasing exponentially. This has a direct impact on the average bandwidth per user. However, the satellite communication links are provided with limited IP traffic transport capacities, which cannot increase during the life of the satellite.

These limitations on the transport capacities therefore directly affect the number of terminals that can be served simultaneously by the system, particularly during the busiest hours of the day. The greater the average bandwidth requirement per terminal, the less the system will be able to serve terminals simultaneously.

Hereinafter in the document, the term "multimedia content" is used to describe any audio, video and/or text content, accessible to the public with or without subscription, by streaming or by downloading. This corresponds to contents that can be accessed on web sites, FTP (File Transfer Protocol) servers, video on demand sites or live multimedia programmes.

BACKGROUND

The invention falls into the context of a high bit rate satellite communication system comprising at least one gateway linked to a server, or cluster of servers, making multimedia contents available via a server, a private network or the public internet network, a satellite link, and a set of terminals accessing the data of the server through the satellite link and the gateway.

The broadcasting of data via the satellite link according to a point-to-multipoint mode (to several identified recipients, or all the terminals present in a same satellite spot) rather than a point-to-point mode makes it possible to avoid performing multiple transmissions of a same content in parallel. This type of broadcasting nevertheless presupposes an a priori knowledge of the request linked to the multimedia content being routed. The choice of the routing mode for a multimedia content according to a point-to-point or point-to-multipoint broadcasting mode can therefore be made according to whether the content, like a TV or radio programme, is assumed to have an audience. This is called assumed popularity.

Some satellite solutions, such as, for example, the one described in the European Patent Application EP 2 480 004, propose adding memory spaces on the terminal side making it possible to store multimedia contents in order to make them available without delay to the users who request them after the broadcast. The most popular streams are then transmitted to be stored during time bands when the network load is less great.

However, these mechanisms are not applicable in the case where a multimedia content is unexpectedly requested by a number of users. They are subject to a decision as to the popularity of a content, which does not change as a function of the requests.

Another method, described in the patent U.S. Pat. No. 8,432,808 B1, consists in delaying the transmission of the content based on various criteria, then in broadcasting content according to a point-to-multipoint broadcasting mode. The criteria can be linked for example to the weight of the file, or to its popularity. By delaying the most popular contents as long as possible, the number of terminals having requested the multimedia content before its transmission increases. This mechanism makes it possible to optimize the satellite resource but presents the drawback of delaying the transmission of the multimedia content, thus increasing the latency of the communication system, and reducing the service quality. It also presents the drawback of applying only to the contents whose transmission can be deferred, and does not therefore apply to the multimedia programmes broadcast live.

The invention provides a solution that makes it possible to maximize the volume of multimedia content broadcast to each of the terminals via the satellite communication link by minimizing the number of retransmissions of a same content while reducing the resource requirements of the system.

Generally, the invention starts from the principle that the more popular a content becomes, the more it needs to be stored as close as possible to the users.

The invention does not introduce any additional latencies in the transmission, thus applying to the live broadcasts (streaming), but also to the conventional contents and web downloading and browsing services, usually conveyed according to a point-to-point broadcasting mode. For this, it makes use of the intrinsic point-to-multipoint broadcasting capacity of the satellite links, by adapting the mode of transmission of the multimedia contents according to a measured popularity, and by storing the most popular contents as close as possible to the satellite terminal.

SUMMARY OF THE INVENTION

The invention proposes inserting routers upstream and downstream of the satellite link, the routers being required to measure the popularity of a multimedia content, to judge the most suitable transmission mode for the satellite transmission, and to store it as close as possible to the end users.

The European Patent Application EP 1 059 763 A2, or the international application WO 00/42519, describe satellite networks comprising routers that have memory. These routers are positioned upstream and downstream of the satellite link. However, the transmission systems described in these documents are not optimal, particularly when a content that is not stored is requested by different user terminals during the time period in which the upstream router makes the request for the content to the server. A number of successive requests will reach the satellite router, which will retransmit the same content as many times, then pointlessly using the bandwidth of the system, notably on the return channel.

The American Patent Application US 2012/0324036 A1 teaches the use of routers that have memory positioned upstream and downstream of the satellite link, the memories of the different routers containing all the same data. When a user terminal requests a content, the upstream router simply returns an index enabling the user terminal to retrieve the content from the router situated downstream of the satellite link. This operation makes it possible to reduce the bandwidth used, but makes unnecessary use of the satellite link, while increasing the latency of response to the user terminal.

The invention therefore relates to a system for transmitting a data stream between a server and a user terminal, the system comprising at least one satellite gateway connected to said server through a satellite router and configured to communicate with at least one satellite terminal via a satellite link, said user terminal being connected to said satellite terminal through a terminal router comprising memory storage resources, the user terminal being configured to make data stream requests to said server. The transmission system is characterized in that:

the terminal router is configured to, when it receives a request for a data stream transmitted by a user terminal, search to see if said data stream is available in its memory resources, and:
  when said data stream is not available, store said request and transmit it to said satellite router,
  when said data stream is available, transmit it to the user terminal, and block the transmission of said request,
the satellite router is configured to, when it receives a request for a data stream:
  transmit the request to the server and receive said data stream,
  estimate a popularity of said data stream as a function of the requests made and, when said popularity is above or equal to a threshold,
  transmit to all the terminal routers a message indicating a correspondence between said data stream and point-to-multipoint broadcasting parameters, and
  convert said data stream into a point-to-multipoint data stream whose broadcasting parameters are those of said correspondence message, and comprising said estimation of popularity of said data stream, then transmit it to the terminal router;
the terminal router is further configured to:
  receive point-to-multipoint data streams,
  convert said point-to-multipoint data stream into one or more point-to-point data streams transmitted to the user terminals having requested them, by using said correspondence messages transmitted by the satellite router, and
  according to its popularity, store said data stream.

In one embodiment of the system, said terminal router is configured to, when a user terminal requests a data stream that is not available in its memory resources, check to see if a correspondence message between said data stream and point-to-multipoint broadcasting parameters has been received, and, if appropriate, block the transmission of said request on the satellite link.

Advantageously, the terminal router is further configured to maintain a database of correspondence between data streams, point-to-multipoint data stream broadcasting parameters, and data stream requests.

Advantageously, said terminal router is further configured to transmit to said satellite router a measurement of a consumption of the data streams available in its memory resources.

According to another embodiment of the system for transmitting a data stream according to the invention, said terminal router is configured to establish a profile of consumption of the data streams requested by each of the user terminals to which it is connected, and store said point-to-multipoint data stream received according to its popularity and said consumption profile.

Advantageously, said satellite router is further configured to select said data streams to be converted into point-to-multipoint data streams as a function of their content.

Advantageously, said terminal router is configured to store the data streams received as a function of their popularity, of the popularity of the streams in memory, and of the memory space available.

Advantageously, said satellite router is configured to store said data stream according to its popularity.

According to another embodiment, the system for transmitting a data stream according to the invention further comprises a terrestrial link between said satellite gateway and said satellite terminal, in which said satellite router is configured to transmit the data streams whose popularity is below said threshold via said terrestrial link.

Advantageously, in the system for transmitting a data stream according to the invention, the message indicating a correspondence between said data stream and point-to-multipoint broadcasting parameters comprises a multicast IP address.

Advantageously, said terminal router is configured to, when it receives a plurality of requests for a same data stream from the user terminals, transmit a single request for said data stream to the server.

Advantageously, in the system for transmitting a data stream according to the invention, said satellite router is configured to transmit the most popular data streams when the usage load of the satellite network is below a threshold.

The invention also relates to a method for transmitting a data stream between a server and a user terminal in a transmission system comprising at least one satellite gateway connected to said server through a satellite router, and configured to communicate with at least one satellite terminal via a satellite link, said user terminal being connected to said satellite terminal through a terminal router comprising memory storage resources, the user terminal being configured to make requests for data streams to said server. The method is characterized in that it comprises the steps of:

searching, by the terminal router upon the sending of a request for a data stream by said user terminal, for said data stream in the memory storage resources and:
  when said data stream is not available, storage and transmission of said request to said satellite router, and implementation of the subsequent steps of the method, or
  when said data stream is available, transmission of said data stream to the user terminal, and blocking of the transmission of said request for a data stream to the server,
transmission, by said satellite router to said server, of said request for a data stream,
transmission, by said server to said satellite router, of said data in the form of a point-to-point data stream,
estimation, by said satellite router, of the popularity of said requested data stream,
when said estimation of popularity is above or equal to said threshold:
  transmission to all of the terminal routers of a message indicating a correspondence between said data stream and point-to-multipoint broadcasting parameters,
  conversion, by said satellite terminal, of said point-to-point data stream into a point-to-multipoint data stream whose broadcasting parameters are those of said correspondence message, transmission, by said satellite terminal, of said point-to-multipoint data stream associated with said estimation of popularity to said terminal router, reception, by said terminal router, of the point-to-multipoint streams transmitted by the satellite router, conversion of said streams into point-to-point data streams transmitted to the user terminals having requested them by using said correspondence message transmitted by the satellite router, and storage, by said terminal router, of said data stream, according to the estimation of popularity.

In one embodiment, the method for transmitting a data stream according to the invention further comprises, when the estimation of popularity made by the satellite router is below a threshold, the steps of:

transmission, by said satellite router, of said point-to-point data stream to the terminal router, and transmission, by said terminal router, of the point-to-point data stream to said user terminal having initiated the request for the data stream.

Advantageously, the method for transmitting a data stream according to the invention further comprises a step, performed by the terminal router when a user terminal requests a data stream that is not available in its memory resources, of checking the reception of a message of correspondence between said data stream and point-to-multipoint broadcasting parameters, and of blocking said request if appropriate.

Advantageously, the method for transmitting a data stream according to the invention further comprises a step of transmission, by said terminal router and to said satellite router, of a measurement of the consumption of the data streams stored by the terminal router, and a step of updating said estimation of popularity made by said satellite router taking into account said measurement of the consumption of the data streams.

BRIEF DESCRIPTION OF THE DRAWINGS

The invention will be better understood and the features and advantages will become more apparent on reading the following description, given in a nonlimiting manner, and through the attached figures in which.

DETAILED DESCRIPTION

Internet traffic, pulled primarily by the consumption of multimedia contents, is experiencing exponential growth.

The average consumption of multimedia contents is increasing, with a current average of more than 6 hours per day per individual in the United States.

This growth is linked to:

the increase in the consumption of multimedia contents corresponding to videos originating from an internet site, or to continuous television channels, and the changeover to high definition or multiview, which is leading to an increase in the bandwidth used by the contents.

All of this contributes to the saturation of the satellite access networks.

It is however possible to optimize the dimension of the satellite high bit rate access networks, by exploiting the fact that a minority of the contents are consumed by a majority of the users, according to the Pareto principle. This hypothesis is confirmed by observation of the law of distribution of the site audiences and of the most popular contents.

The idea behind the invention is to broadcast the most popular multimedia contents in point-to-multipoint mode to storage points located at the terminals of the satellite access network, in order to lighten the load on the network resources, particularly in peak traffic hours.

The problem lies in how to define a mechanism that makes it possible:

to identify the high-audience multimedia contents eligible for transmission on the resources for broadcasting to the storage points, and to free the storage points of contents whose popularity has become insufficient.

Hereinafter in the document, "point-to-point link" will be used to describe a link to a single party, generally identified by his or her IP address, called Unicast IP address.

"Point-to-multipoint link" will be the term used in the context of a link to multiple users, even to all the equipment items of one and the same satellite spot. Generally, the recipients of a point-to-multipoint link form part of a group identified through a specific IP address, called multicast IP address.

Figure 1:
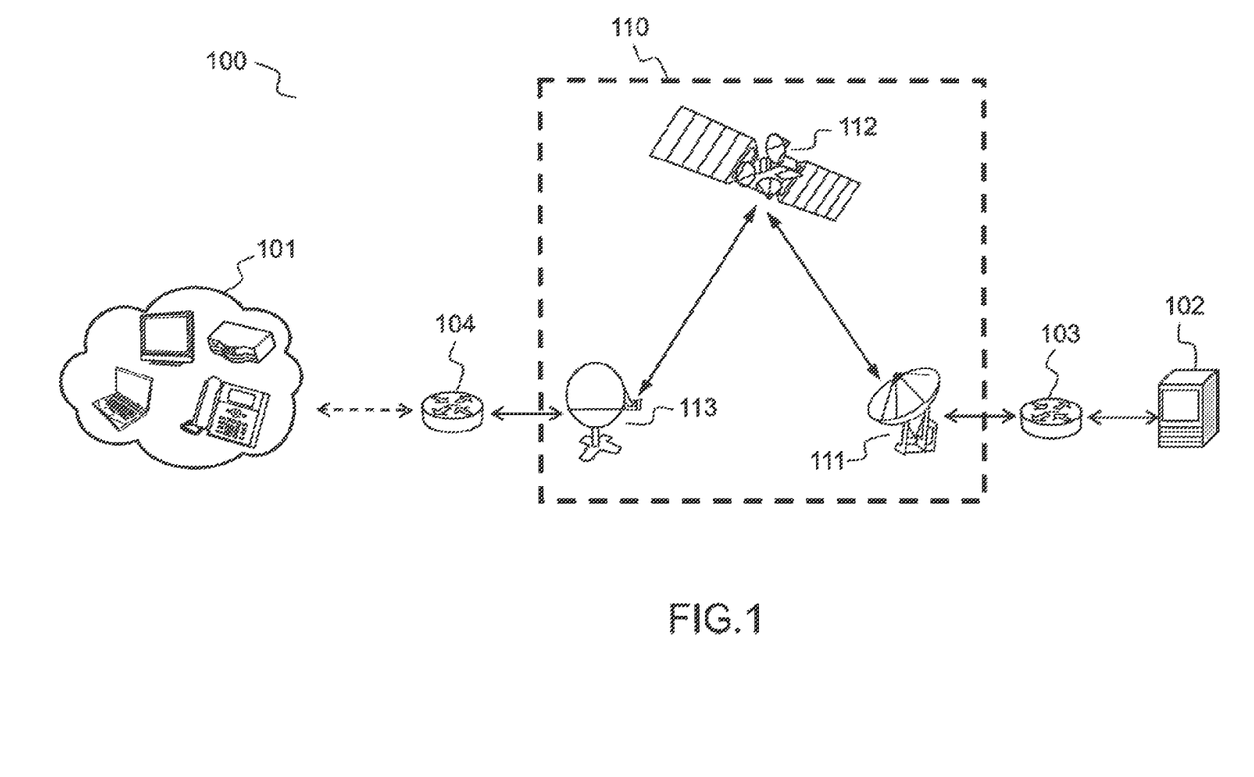
FIG. 1 presents an embodiment of an architecture of a satellite communication system according to the invention.

FIG. 1 presents the architecture of a satellite communication system 100 implementing the invention. Generally, this type of system operates in the Ka or Ku frequency bands on the service link.

The system is made up of a set of user terminals 101, a space segment 110 comprising a satellite gateway 111, a satellite 112 and a satellite terminal 113. The satellite gateway is linked to a server 102 making it possible to access multimedia contents.

The space segment is capable of generating one or more adjacent spots. The satellite gateways and terminals transmit and receive carriers in one or more spots and establish connections between the terminals and the server. The system can then comprise a number of satellite terminals 113, each of these terminals being linked to a set of different user terminals 101. Hereinbelow, only one of these satellite terminals is represented, but the invention applies equally in the presence of several of these terminals.

The communication system represented in FIG. 1 can, for example, implement a DVB-S (satellite communication standard, the acronym of which is Digital Video Broadcasting-Satellite) or DVB-S2 (acronym for DVB-S—second generation) data link with a DVB-RCS (acronym for DVB—Return Channel via Satellite) or DVB-RCS2 (acronym for DVB-RCS—second generation) return channel.

The invention consists in inserting smart routers, that is to say routers including computation means making it possible to execute instructions and comprising or being able to access memory storage resources, the routers being on the path of the data between the user terminal and the server, at the input and at the output of the satellite link. A first router 103, hereinafter called satellite router, is associated with the satellite gateway. A second router 104, hereinafter called terminal router, is associated with each of the satellite terminals.

The routers are intermediate equipment items that make it possible to transfer data packets from one network to another. They can simply consist of two network cards associated with suitable software, the software also implementing the method described here. A computer, or any computation machine configured to execute the method according to the invention, can act as router.

The function of the satellite router 103 is to measure an index of popularity of the multimedia contents requested. This popularity index will be able to depend, for example, on the number of user requests, by implementing a sliding average over a period of determined duration, or on the size of the content. A multimedia content is considered to be popular when its index crosses a threshold which depends on its relative ranking in the list of the most popular multimedia contents.

The calculation of the popularity index can also take into account other criteria, such as the manual identification of a set of sources of "a priori" popularity declared by manual configuration in the gateways. This corresponds for example to a list of websites (e.g. YouTube, Netflix, etc.), of network domains (e.g. www.microsoft.com, etc.) or of other formats (e.g. IP addresses of the servers, etc.).

Other criteria can be taken into account, such as the seniority of the content, the type of content, or other criteria which are put in place in the traditional CDN (Content Delivery Network) networks, such as the size of the objects for example. A very old content is generally less popular than a recent content. The type of content is also predominant, according to whether it concerns for example TV series, films, or news-related resources, weather forecasts, or sporting events for example.

Also, geographic restrictions may arise as to the broadcasting of certain contents in certain countries. The operators can take into account these restrictions by forcing a popularity index as having to remain zero for certain spots or certain satellite gateways covering countries and contents subject to restrictions.

Finally, if the operator who uses the satellite communication network services has established partnership agreements with another network or service operator, the latter can also periodically provide the operator with popularity indices, as well as certain specific contents to be prioritized (notably, if the satellite operator also offers its own services and contents, the method can make it possible to supply the user terminals).

The satellite gateways that can manage different geographic areas are mutually informed as to the popularity indices of the multimedia contents.

The value of the popularity threshold to be used to determine the broadcasting mode for the content is parameterizable. Without being critical, it will influence the overall performance of the communication system:

a threshold value that is too high will limit the number of contents for which the method for optimizing the broadcasting mode for the contents according to the invention will be implemented, a threshold value that is too low will unnecessarily create activity by applying the method for contents for which the demand is low.

When audio visual contents are being broadcast live, the invention makes it possible to start the broadcast only when the popularity is not zero, and therefore not unnecessarily strain the satellite resource.

Another function of the satellite router 103 is, when the content requested exceeds a certain level of popularity, to convert the point-to-point data stream into a point-to-multipoint data stream.

The terminal router 104 has storage resources. These resources can be incorporated in the router, or be external resources to which the router has access, such as, for example, a hard disk attached to the router, or to the network of the satellite terminal.

The role of this terminal router is to convert point-to-multipoint streams received from the satellite link into point-to-point streams. It also places the most popular multimedia contents received in cache memory, in order to make them available subsequently to the user terminals without straining the satellite link.

Figure 2:
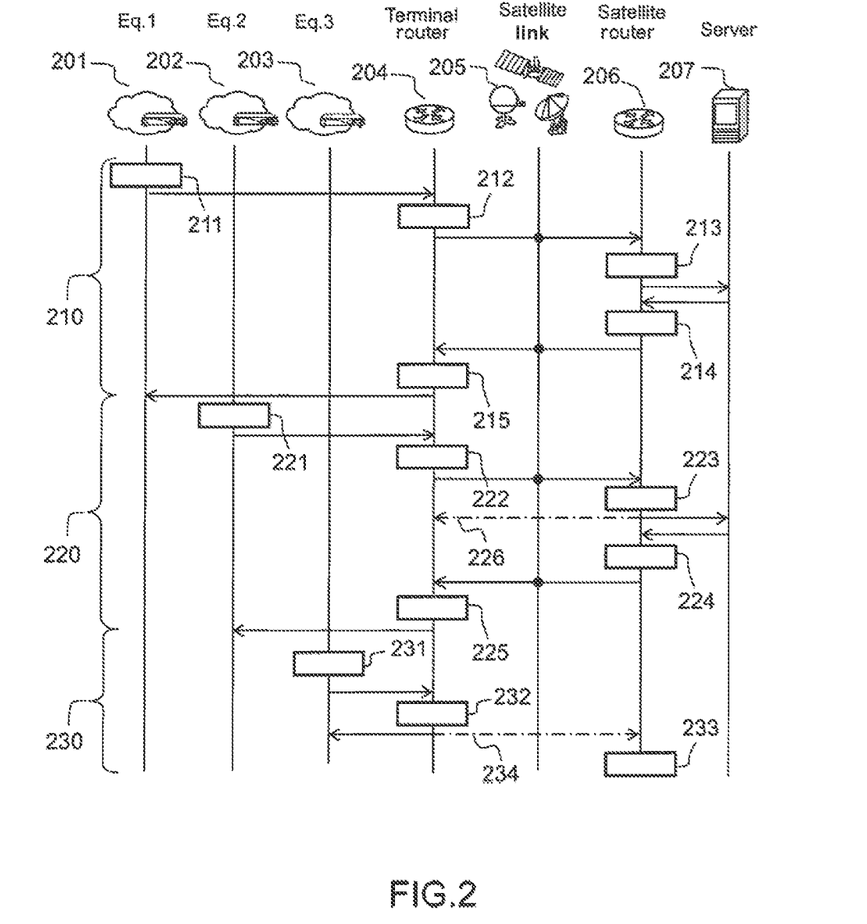
FIG. 2 presents a sequencing diagram of the steps of the satellite communication method according to the invention.

FIG. 2 presents a sequencing diagram of the steps of the satellite communication method according to the invention.

A first equipment item 201 wants to access data, such as, for example, a multimedia content. All of the steps implemented when the popularity of the content is below a threshold are represented under the reference 210. The first equipment item transmits 211 the request for a data stream relating to a multimedia content to the server 207. This server, when it is administered by the satellite service operator, can have a local copy of the contents deemed the most popular that it has been previously able to store. It can also be a point of access to the network making the requested content available. The request passes through the satellite link 205. A smart router, called satellite router 206, is positioned upstream of this satellite link, a second smart router, called terminal router, is positioned downstream of this satellite link.

The requested transmitted by the first equipment item passes through the terminal router. The latter then carries out the step 212 of:

analysing the request in order to check whether the requested multimedia content is present in the memory storage resources, storing the identifier of the user terminal originating the request, and the requested content not being present in the memory resources, transmitting the request to the server 207, through the satellite link 205.

The satellite router is located on the data path of the request. It carries out the step 213 of:

analysing the request in order to update a measurement of the popularity of the content, comparing this popularity with a threshold, and, with the popularity measurement being below the threshold, transmitting the request to the server.

The server responds to the request by returning a point-to-point data stream comprising the requested multimedia content. This data stream is intended for the user terminal having made the initial request. The satellite router is located on the data path. It then carries out a step 214 of transmitting the data stream to the terminal router, without modifying it.

The terminal router, in the step 215, recovers the point-to-point data stream and transmits it to the equipment item originating the request.

The steps implemented under the reference 220 illustrate the behaviour of the system when the data exceed a popularity threshold.

Thus, a second equipment item 202 transmits 221 the request for a data stream, identical to the data stream requested in the step 201.

The terminal router then carries out the step 222, identical to the step 212, and transmits the request to the satellite router.

The latter then carries out the steps 223 of:

analysing the request in order to update the measurement of the popularity of the content, comparing the popularity with a threshold, and, with the popularity measurement being equal to or above the threshold, transmitting to the terminal router a signalling message 226 making it possible to associate a connect with a multicast IP address, then transmitting the request to the server.

The server responds to the request by returning a point-to-point data stream comprising the requested multimedia content. This data stream is intended for the user terminal having made the initial request. The satellite router is located on the data path. It then carries out a step 224 of:

converting the point-to-point data into a point-to-multipoint data stream, transmitting the point-to-multipoint data stream to the terminal router, associated with the popularity measurement.

The terminal router will, in the step 225:

recover the point-to-multipoint data stream, convert it into multiple point-to-point data streams, transmit them to the user terminals that have requested the content, and compare the popularity measurement transmitted with the popularity measurements of the other streams stored in memory and the space available, in order to store the data stream or not.

The conversion of the point-to-point data stream into a point-to-multipoint data stream can be done by modifying the IP datagrams transported, that is to say by replacing the destination address of the data stream with the multicast destination address transmitted by the message 226 to the terminal router.

The transporting of the data in Multicast IP format can be done by the use of standard encapsulation methods, such as GSE (the acronym for Generic Stream Encapsulation), ULE (the acronym for Unidirectional Lightweight Encapsulation) or MPE (the acronym for Multiprotocol Encapsulation).

By default, the satellite terminals of the system do not filter any Multicast IP streams, these datagrams being transmitted directly to the local terminal router.

The satellite routers have to maintain a database comprising, for each of the popular contents identified, for example, by their URL (the acronym for Uniform Resource Locator) or a combination of parameters that can include the address of the server of origin and the port numbers, the Multicast IP address used for the transmission.

The terminal routers have to maintain a database comprising, for each of the contents, the list of the identifiers, or IP addresses, of the users having sent a request to access this content.

When the satellite router takes the decision to broadcast a content according to a point-to-multipoint broadcasting mode, it informs all of the terminal routers thereof through a point-to-multipoint signalling message 226 comprising the identification of the content, and the broadcasting parameters which will be used for the broadcasting of this object, such as, for example, the Multicast IP address.

When a terminal router receives a Multicast IP stream, it can thus instantly identify the Unicast IP address or addresses of the user terminals having transmitted the request, by consulting its list correlating the identifiers and the contents. It will then be able to generate the Unicast IP streams to each of the subscribers. For this, a duplication of the datagrams is necessary.

The signalling message 226 also makes it possible to inform all of the terminal routers of the communication system that a request concerning an identified content is in progress, and that the information will soon be available in the memory associated with the terminal router. This is useful to avoid having other requests transmitted to the same content by other satellite terminals during the time interval necessary for the server to have the requested data available.

The elements of the signalling message therefore comprise the address of the equipment item that has requested the content, the description of the content (for example the requested URL) and the multicast address used for the point-to-multipoint broadcast, possibly associated with the port number on which the stream is broadcast.

Thus, in the steps 212 or 222 of analysis of the request received by the terminal router from a user terminal, the terminal router also takes account of the reception, or non-reception, of such a message 226 of correspondence between a content and point-to-point broadcasting parameters for the requested content. If this message has been received, the terminal router is then informed that the content has already been requested by a terminal connected to another terminal router, that it is currently being requested from the server 207, and that it will soon be transmitted to the terminal router. The transmission of the request to the satellite terminal is then blocked.

The broadcasting of the message 226 then makes it possible to limit the load:

on the return channel of the satellite terminals, by blocking the stream requests that are currently being routed, but also on the forward channel to the satellite terminals, by avoiding the undue rebroadcasting of streams requested by a number of user terminals in the time interval necessary for the satellite router to request the stream from the server, receive it, convert it into point-to-multipoint streams, and transmit it to the terminal routers of the communication system.

The message (226) can be broadcasted by the satellite router immediately, in a scheduled periodic time slot (e.g. every N frames) or as soon as radio resources are available in the communication system.

The message (226) can be broadcasted to the whole satellite terminals of the communication system, or limited to the satellite terminals belonging to a precise geographic area (defined by one or many satellite spots).

The terminal router will also compare the popularity measurement transmitted with the popularity measurements of the other streams stored in its memory, as well as the space available, in order to decide whether or not to store the data stream.

The steps implemented under the reference 230 illustrate the behaviour of the system when the requested data are stored in the terminal router.

A third equipment item 203 transmits 231 the request to a data stream. This data stream being present in the memory storage resources of the terminal router, the latter will, in the step 232:

transmit said data stream to the third equipment item, transmit to the satellite router a message 234 indicating that a stored content has been requested by a user terminal, and not propagate the content request to the server, the requested content having been made available to the third equipment item.

The satellite router takes into account 233 the message 234 to update the measurement of the popularity of the content.

Advantageously, the message indicating that a stored content has been requested can be transmitted to the satellite router when a same content in memory has been requested a plurality of times. The message can also be transmitted periodically, possibly by combining the measurements associated with a number of contents.

The satellite router will take this message into account to update 233 the estimated measurement of popularity of the data stream.

The architecture of the satellite communication system described here makes it possible, when a user requests a multimedia content not available in the memory resources associated with the terminal router, to broadcast (or rebroadcast) the content via the satellite link, associated with its updated popularity index. This broadcasting is done in point-to-multipoint mode. Thus, all of the satellite terminals of the satellite spot receive the data stream. This operation differs from the normal operation of the satellite transmission systems, in which the point-to-point data are generally filtered at the MAC (Medium Access Layer, or data link layer) level.

Advantageously, in the steps 212 and 213, when the satellite router or the terminal router simultaneously receive a number of requests for a same content, they respectively transmit to the satellite router and to the server only a single request, thus optimizing the bandwidth consumption on the return link of the satellite system. At the terminal router, this operation is done by adding the identifiers of the users having requested the content to the list of correspondence between the identifiers of the users and the requested contents.

Advantageously, in the step 213 or 214, the satellite router can carry out a first phase of selection of the appropriate multimedia contents that broadcast in point-to-multipoint mode. This selection can be done by recognition of the signalling headers, by identification of the IP packet sizes, or by any other technique implemented, such as, for example, the techniques of "Deep Packet Inspection". In effect, it is inappropriate to broadcast in point-to-multipoint mode data such as messaging exchanges, telephone traffic or private audio/video conferences.

Advantageously, the satellite router can comprise memory storage resources, enabling it to store the most popular contents. In this way, when the requested content is stored, the steps 213 and 214 are performed simultaneously by the satellite router, which does not transmit the content request to the server 207. The latency of access to the contents to be broadcast is then reduced, thus improving the service quality.

Advantageously, the terminal router establishes a profile of the content requests from the users that it serves. A consumption profile is characterized by a type of content (for example video, web, images, etc.), a genre (for example sport, politics, etc.), a language, or any other criterion making it possible to characterize the content. This profile of consumption of the different users linked to a satellite terminal is used together with the popularity measurement in order to determine the contents most likely to be stored. For example, if the consumption profile shows that none of the equipment items consume video contents in the German language, such a content having a high popularity will not be stored. The choice of whether or not to store a data stream is then made by considering the popularity of the content, weighted by a score of suitability to the consumption profile of the terminal router.

The invention can be implemented at the level of a unique satellite spot, as described above, but also at the level of a geographical area defined, for instance, by the footprint of one or many geographical spots, or to the whole network.

In the latter cases, the popularity measurements of the various data stream shall be realised at the scale of the area concerned, as well as the broadcast of the signalisation message (226) and the broadcast of the point-to-multipoint data stream (224).

Figure 3:
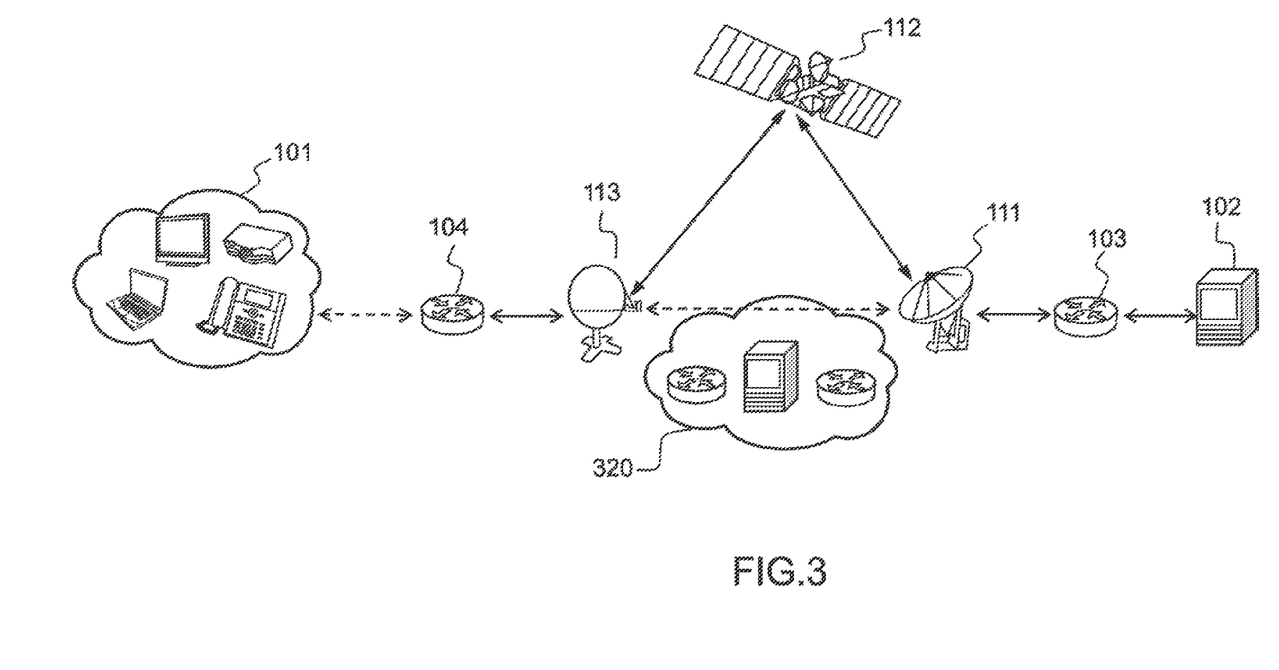
FIG. 3 presents a second embodiment of an architecture of a satellite communication system according to the invention.

FIG. 3 presents a second embodiment of an architecture of a satellite communication system according to the invention, in which the satellite communication network is used together with a terrestrial communication network 320, such as, for example, an ADSL (Asymmetric Digital Subscriber Line) network or a cellular network.

This embodiment is essentially intended for the routing of OTT (Over The Top) contents, that is to say contents for which the content provider is on the internet network, and does not control the network linking it to the user. Such is conventionally the case with the broadcasting of internet contents, by contrast to the services for which the service provider offers the content (for example, VOD, or Video On Demand), even though this embodiment could also be applied to these contents.

This embodiment adds, to the infrastructure of the satellite communication network described in FIG. 1, a dynamic load shedding system for the satellite link. This load shedding system can for example be a high bit rate terrestrial communication system. The same embodiment applies for a satellite system used in load shedding for a high bit rate terrestrial communication system.

The satellite router 111 then carries out the routing of the data streams, that is to say that it takes the decision to route them by using the terrestrial infrastructure of the operator, or the satellite link. This choice is carried out on the basis of the application of the content popularity estimation function. The most popular contents are distributed via the satellite broadcasting interface, which is appropriate for the transmission of point-to-multipoint communications, whereas the other contents are transmitted by the terrestrial channel, which is more appropriate for the transmission of point-to-point communications.

In this embodiment, the value of the threshold determines the distribution of the routing between the terrestrial network and the satellite network.

This value can be parameterizable, so as to be able to change as a function of the load and/or of the cost of each of these networks.

Advantageously, in this embodiment, the terminal router can be configured to transmit all of the stream requests via the satellite communication system.

When there is no advantage to be gained by placing the streams in memory, such as, for example, in the context of the broadcasting of audio visual contents live, or when the terminal router does not have any memory storage resources, the method according to the invention can be adjusted, by eliminating the steps regarding the storage of the data streams in the storage resources associated with the terminal router or with the satellite router. In this way, it makes it possible to be able to exploit the multi-broadcast resources of the satellite link as a function of a real popularity measurement and not an assumed popularity measurement.

This embodiment can make it possible to limit the investment and the operational cost linked to the implementation of memory storage resources on the routers.

The method then makes it possible to select the transmission mode for a content as a function of the estimated popularity of the multimedia contents. The provision of the contents directly by the terminal router is not possible, but this method is nevertheless advantageous.

There are therefore many advantages of the solution proposed in the invention:

- The number of retransmissions of a popular multimedia content to the terminals of a satellite communication system is minimized, thus optimizing the network load. This load reduction has a direct impact on the dimensioning of the satellite network;
- The system for storing the contents according to their popularity makes it possible to reduce the latencies of access to the most popular multimedia contents, thus increasing the service quality and the user's experience;
- The system makes optimum use of the bandwidth, the communication of the contents being done upon a user request, and not having to be anticipated when the load levels of the satellite access network drop;
- The popularity measurement used for the choice of the broadcasting mode for a content is a real popularity, and not a supposed popularity, which changes over time;
- The system applies to the broadcasting of events live, and does not add any delay to the transmission;
- The system dynamically and optimally manages the memory space associated with the terminal router;
- The solution is transparent with regard to the internet traffic, CDN protocols and end-to-end cache storage systems;
- The system could be compatible with secure contents through a delegation of security granted by the content providers to the satellite operator;
- The solution can be generalized to a communication system having a number of satellite gateways, in which the satellite routers, through a terrestrial network, can exchange content popularity indices, and can distribute and/or duplicate the popular contents in memory;
- The solution can be applied to a hybrid access combining a satellite access network and a terrestrial access network, thus optimizing the load of the satellite network and/or of the terrestrial network;
- The solution can be applied to a satellite access network having multiple gateways distributed in different sites/countries;
- The solution can be extended to the case where the server 102 is a point of presence (PoP) of a CDN network.

The invention claimed is:

1. A system for transmitting a data stream between a server and one or more user terminals, comprising:
   at least one satellite gateway connected to said server through a satellite router, and configured to communicate with at least one satellite terminal via a satellite link, said system further comprising:
   one or more terminal routers comprising memory storage resources, each user terminal being connected to said satellite terminal through one of said terminal routers, the user terminals being configured to make data stream requests to said server, wherein:
   the terminal routers are configured to, when receiving a request for a data stream transmitted by a specific user terminal, search to see if said data stream is available in their memory resources, and:
      when said data stream is not available, store said request and transmit it to said satellite router,
      when said data stream is available, transmit it to the specific user terminal, and block the transmission of said request;
   the satellite router is configured to, when it receives a request for a data stream:
      transmit the request to the server and receive said data stream,
      estimate a popularity of said data stream as a function of the requests made and, when said popularity is above or equal to a threshold:
         transmit to all the terminal routers a message indicating a correspondence between said data stream and point-to-multipoint broadcasting parameters, and
         convert said data stream into a point-to-multipoint data stream whose broadcasting parameters are those of said correspondence message, and comprising said estimation of popularity of said data stream, then transmit it to the terminal routers;
   the terminal routers being further configured to:
      receive point-to-multipoint data streams,
      convert the point-to-multipoint data streams received into point-to-point data streams transmitted to the user terminals having requested them, by using said correspondence messages transmitted by the satellite router, and
      according to its popularity, store said data stream.

2. The system of claim 1, wherein said terminal routers are configured to, when a specific user terminal requests a data stream that is not available in its memory resources, check to see if a correspondence message between said data stream and point-to-multipoint broadcasting parameters has been received, and, if appropriate, block the transmission of said request on the satellite link.

3. The system of claim 1, wherein the terminal routers are further configured to maintain a database of correspondence between data streams, point-to-multipoint data stream broadcasting parameters, and data stream requests.

4. The system of claim 1, wherein said terminal routers are further configured to transmit to said satellite router a measurement of a consumption of the data streams available in their memory resources.

5. The system of claim 1, wherein said terminal routers are configured to establish a profile of consumption of the data streams requested by each of the user terminals to which it is connected, and store said point-to-multipoint data stream received according to its popularity and said consumption profile.

6. The system of claim 1, wherein said satellite router is further configured to select said data streams to be converted into point-to-multipoint data streams as a function of their content.

7. The system of claim 1, wherein said terminal routers are configured to store the data streams received as a function of their popularity, of the popularity of the streams in memory, and of the memory space available.

8. The system of claim 1, wherein said satellite router is configured to store said data stream according to its popularity.

9. The system of claim 1, further comprising a terrestrial link between said satellite gateway and said satellite terminal, wherein said satellite router is configured to transmit the data streams whose popularity is below said threshold via said terrestrial link.

10. The system of claim 1, wherein the message indicating a correspondence between said data stream and point-to-multipoint broadcasting parameters comprises a multicast IP address.

11. The system of claim 1, wherein said terminal routers are configured to, when receiving a plurality of requests for a same data stream from the user terminals, transmit a single request for said data stream to the server.

12. The system of claim 1, wherein said satellite router is configured to transmit the most popular data streams when the usage load of the satellite network is below a threshold.

13. A method for transmitting a data stream between a server and one or more user terminals in a transmission system comprising at least one satellite gateway connected to said server through a satellite router, and configured to communicate with at least one satellite terminal via a satellite link, said system further comprising one or more terminal routers comprising memory storage resources, each user terminal being connected to said satellite terminal through one of said terminal routers, the user terminals being configured to make requests for data streams to said server, the method comprising the steps of:
- searching, by a terminal router receiving a request for a data stream transmitted by a specific user terminal, for said data stream in their memory storage resources, and:
  - when said data stream is not available, storing and transmitting said request to said satellite router, and implementing the subsequent steps of the method, or
  - when said data stream is available, transmitting said data stream to the specific user terminal, and blocking the transmission of said request for a data stream to the server,
- transmission, by said satellite router to said server, of said request for a data stream,
- transmission, by said server to said satellite router, of said data in the form of a point-to-point data stream,
- estimation, by said satellite router, of the popularity of said requested data stream,
- when said estimation of popularity is above or equal to said threshold:
  - transmission to all of the terminal routers of a message indicating a correspondence between said data stream and point-to-multipoint broadcasting parameters,
  - conversion, by said satellite terminal, of said point-to-point data stream into a point-to-multipoint data stream whose broadcasting parameters are those of said correspondence message,
  - transmission by said satellite terminal, of said point-to-multipoint data stream associated with said estimation of popularity to said terminal routers,
  - reception, by said terminal routers, of the point-to-multipoint streams transmitted by the satellite router, and conversion of said streams into point-to-point data streams transmitted to the user terminals having requested them by using said correspondence message transmitted by the satellite router, and
  - storage, by said terminal routers, of said data stream, according to the estimation of popularity.

14. The method of claim 13, further comprising, when the estimation of popularity made by the satellite router is below a threshold, the steps of:
- transmission, by said satellite router, of said point-to-point data stream to the terminal routers, and
- transmission, by said terminal router, of the point-to-point data stream to said specific user terminal having initiated the request for the data stream.

15. The method of claim 13, further comprising a step, performed by the terminal routers when a specific user terminal requests a data stream that is not available in its memory resources, of checking the reception of a message of correspondence between said data stream and point-to-multipoint broadcasting parameters, and of blocking said request if appropriate.

16. The method of claim 13, further comprising a step of transmission, by said terminal routers and to said satellite router, of a measurement of the consumption of the data streams stored by the terminal router, and a step of updating said estimation of popularity made by said satellite router taking into account said measurement of the consumption of the data streams.

* * * * *